US008923649B2

(12) United States Patent
Kanalakis, Jr. et al.

(10) Patent No.: US 8,923,649 B2
(45) Date of Patent: Dec. 30, 2014

(54) SYSTEM AND METHOD FOR CALIBRATING DISPLAY OVERSCAN USING A MOBILE DEVICE

(75) Inventors: John M. Kanalakis, Jr., Campbell, CA (US); Zachary R. Bean, Milpitas, CA (US); Rene A. Villanueva, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 634 days.

(21) Appl. No.: 13/226,341

(22) Filed: Sep. 6, 2011

(65) Prior Publication Data
US 2013/0058593 A1    Mar. 7, 2013

(51) Int. Cl.
*H04N 7/01*        (2006.01)
*H04N 7/00*        (2011.01)
*H04N 21/4788*     (2011.01)
*H04N 21/41*       (2011.01)
*H04N 21/485*      (2011.01)
*H04N 7/14*        (2006.01)
*H04N 21/4223*     (2011.01)
*H04N 21/422*      (2011.01)
*G06K 9/62*        (2006.01)
*G09G 3/00*        (2006.01)

(52) U.S. Cl.
CPC ............... *H04N 7/007* (2013.01); *G09G 3/006* (2013.01); *H04N 21/4788* (2013.01); *H04N 21/4126* (2013.01); *H04N 21/4858* (2013.01); *H04N 7/147* (2013.01); *H04N 21/4223* (2013.01); *H04N 21/42203* (2013.01)
USPC .......................................... 382/286; 348/181

(58) Field of Classification Search
USPC .......................................................... 382/286
See application file for complete search history.

(56) References Cited

U.S. PATENT DOCUMENTS

| 4,432,009 | A | * | 2/1984 | Reitmeier et al. | 348/580 |
|---|---|---|---|---|---|
| 5,119,082 | A | * | 6/1992 | Lumelsky et al. | 345/600 |
| 5,475,447 | A | * | 12/1995 | Funado | 348/745 |
| 5,625,410 | A | * | 4/1997 | Washino et al. | 348/154 |
| 5,801,767 | A | * | 9/1998 | Wu | 348/190 |
| 5,945,991 | A | * | 8/1999 | Britt et al. | 715/767 |
| 6,678,009 | B2 | * | 1/2004 | Kahn | 348/569 |
| 7,423,695 | B2 | * | 9/2008 | Panabaker | 348/581 |
| 7,489,336 | B2 | * | 2/2009 | Lim | 348/181 |
| 7,889,217 | B2 | * | 2/2011 | Sakuma et al. | 345/699 |
| 2003/0169367 | A1 | | 9/2003 | Ranta | |
| 2003/0228127 | A1 | | 12/2003 | Buxton | |
| 2005/0204400 | A1 | | 9/2005 | Ranta et al. | |
| 2006/0050013 | A1 | | 3/2006 | Nason et al. | |
| 2008/0100597 | A1 | | 5/2008 | Quan | |

* cited by examiner

*Primary Examiner* — Sath V Perungavoor
*Assistant Examiner* — Howard D Brown, Jr.
(74) *Attorney, Agent, or Firm* — Patent Capital Group (57) ABSTRACT

A method is provided in one example and includes displaying a calibration area surrounded by a background on a display; analyzing an image of the calibration area to determine if the background is detectable in the image; adjusting the calibration area until at least a portion of the background is not detectable; and storing the adjustment for the calibration area. In more particular examples, the method may include determining a percentage of the background that is detectable; and adjusting the calibration area based on the percentage. In yet other instances, the method may include decreasing a size of the calibration area if the size of the calibration area is bigger than the display.

20 Claims, 7 Drawing Sheets

SYSTEM AND METHOD FOR CALIBRATING DISPLAY OVERSCAN USING A MOBILE DEVICE

TECHNICAL FIELD

This disclosure relates in general to the field of communications and, more particularly, to calibrating display overscan using a mobile device.

BACKGROUND

Video services have become increasingly important in today's society. In certain architectures, service providers may seek to offer sophisticated video conferencing services for their end users. The video conferencing architecture can offer an "in-person" meeting experience over a network. Video conferencing architectures can deliver real-time, face-to-face interactions between people using advanced visual, audio, and collaboration technologies. In typical production scenarios, different manufacturers develop video displays that vary in their displayable area due to manufacturing tolerances and design. As a result, content providers and set-top box manufacturers are forced to limit their screen allocations for information to be positioned on a given display. Hence, the ability to optimize video communications provides a significant challenge to system designers, device manufacturers, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes displaying a calibration area surrounded by a background on a display; analyzing an image (e.g., any type of video data) of the calibration area to determine if the background is detectable in the image; adjusting the calibration area until at least a portion of the background is not detectable; and storing the adjustment for the calibration area (e.g., on the display, in memory, etc.). In more particular examples, the method may include determining a percentage of the background that is detectable; and adjusting the calibration area based on the percentage.

In yet other instances, the method may include decreasing a size of the calibration area if the size of the calibration area is bigger than the display. Additionally, the method may include receiving a signal from a mobile device indicating that the background is detectable. Note that the background is not detectible if the area of the background is less than two percent of the area of the display. In yet other instances, the method may include analyzing the image of the calibration area for a particular color indicative of an unsafe area for rendering content on the display.

Example Embodiments

Figure 1:
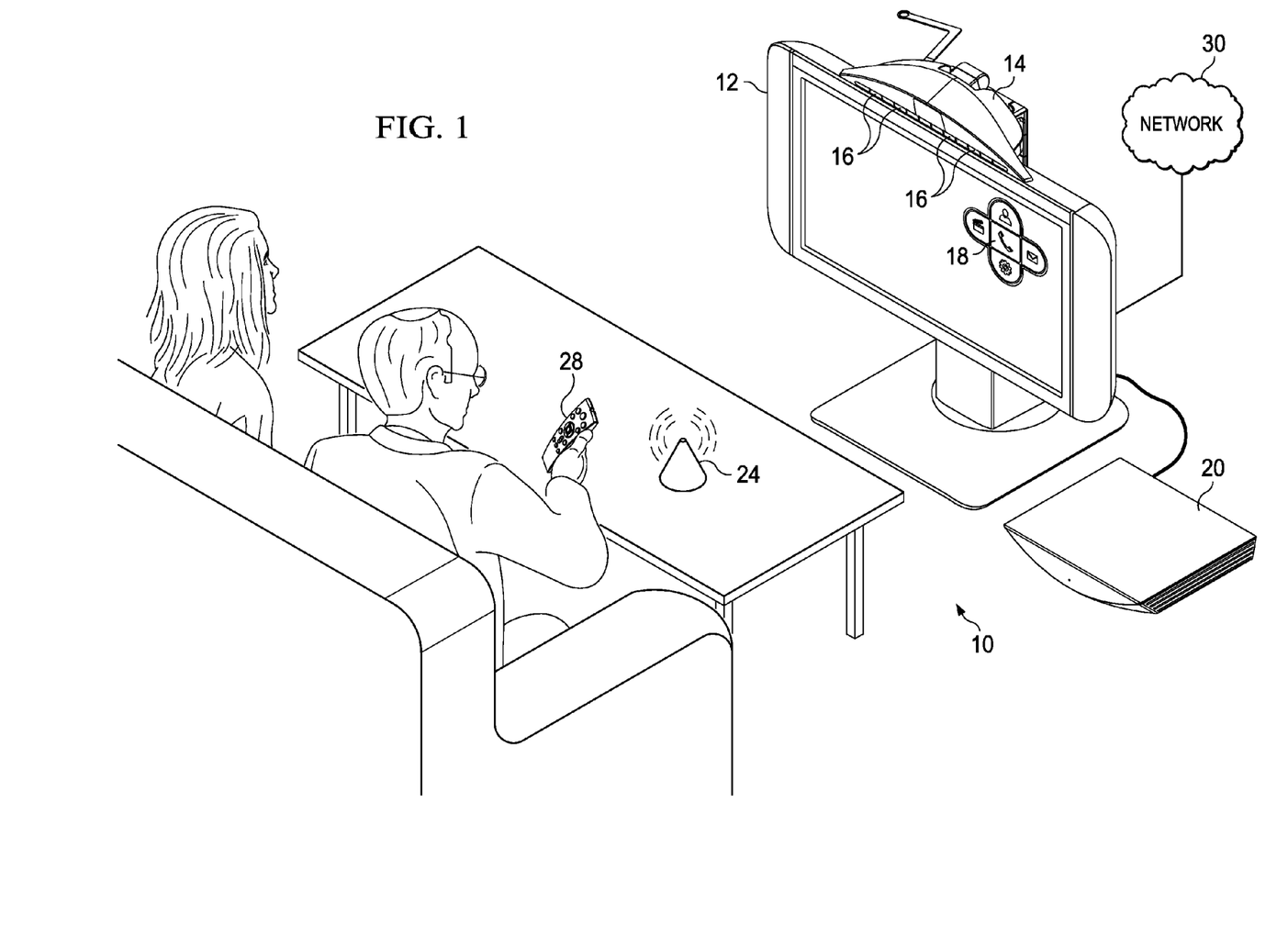
FIG. 1 is a simplified block diagram of a system for providing a video session in accordance with one embodiment of the present disclosure.

Turning to FIG. 1, FIG. 1 is a simplified block diagram of a system 10 for providing a video session for which overscan activities are prevalent. In this particular example, system 10 may include a display 12, a camera element 14, a user interface (UI) 18, a console element 20, a handset 28, and a network 30. A series of speakers 16 are provisioned in conjunction with camera element 14 in order to transmit and receive audio data. In one particular example implementation, a wireless microphone 24 is provided in order to receive audio data in a surrounding environment (e.g., from one or more audience members). Note that this wireless microphone 24 is purely optional, as speakers 16 are capable of sufficiently capturing audio data in a surrounding environment during any number of video applications (which are detailed below). System 10 may include a configuration capable of transmission control protocol/internet protocol (TCP/IP) communications for the transmission and/or reception of packets in a network. System 10 may also operate in conjunction with a user datagram protocol/IP (UDP/IP) or any other suitable protocol, where appropriate and based on particular communication needs.

In general terms, because of the varying size of displayable areas due to the many differences in manufacturing tolerances and designs of display 12, an eighty percent (80%) centered area of display 12 is typically designated as safe for information preservation. Stated in different terms, this centered region of display 12 is relegated for the rendering of important information (i.e., content), which may be displayed without the risk of the content being cut-off. Indirectly, this space allocation also means that a twenty percent (20%) area of display 12 is deemed as an unsafe area for which important information would not be displayed. As a result, the twenty percent (20%) area of display 12 is wasted: even though it is available for image data.

In operation, system 10 can be configured to display a calibration area surrounded by a background unsafe area and increase the size of the calibration area until the background unsafe area is no longer visible. The term 'surround' in this context is meant to include the background being provided under, around, or proximate to the calibration area, which can include any type of video data or images for performing calibration activities. In addition, the centered region of display 12 (for which important information may be displayed without the risk of cut-off) can be determined. System 10 can also be configured to calibrate display overscan such that content providers and set-top box manufacturers would not be forced to unnecessarily limit themselves to the eighty percent (80%) centered area when displaying information on display 12. In essence, the entirety of display 12 can be fully utilized, as detailed below.

Figure 2A:
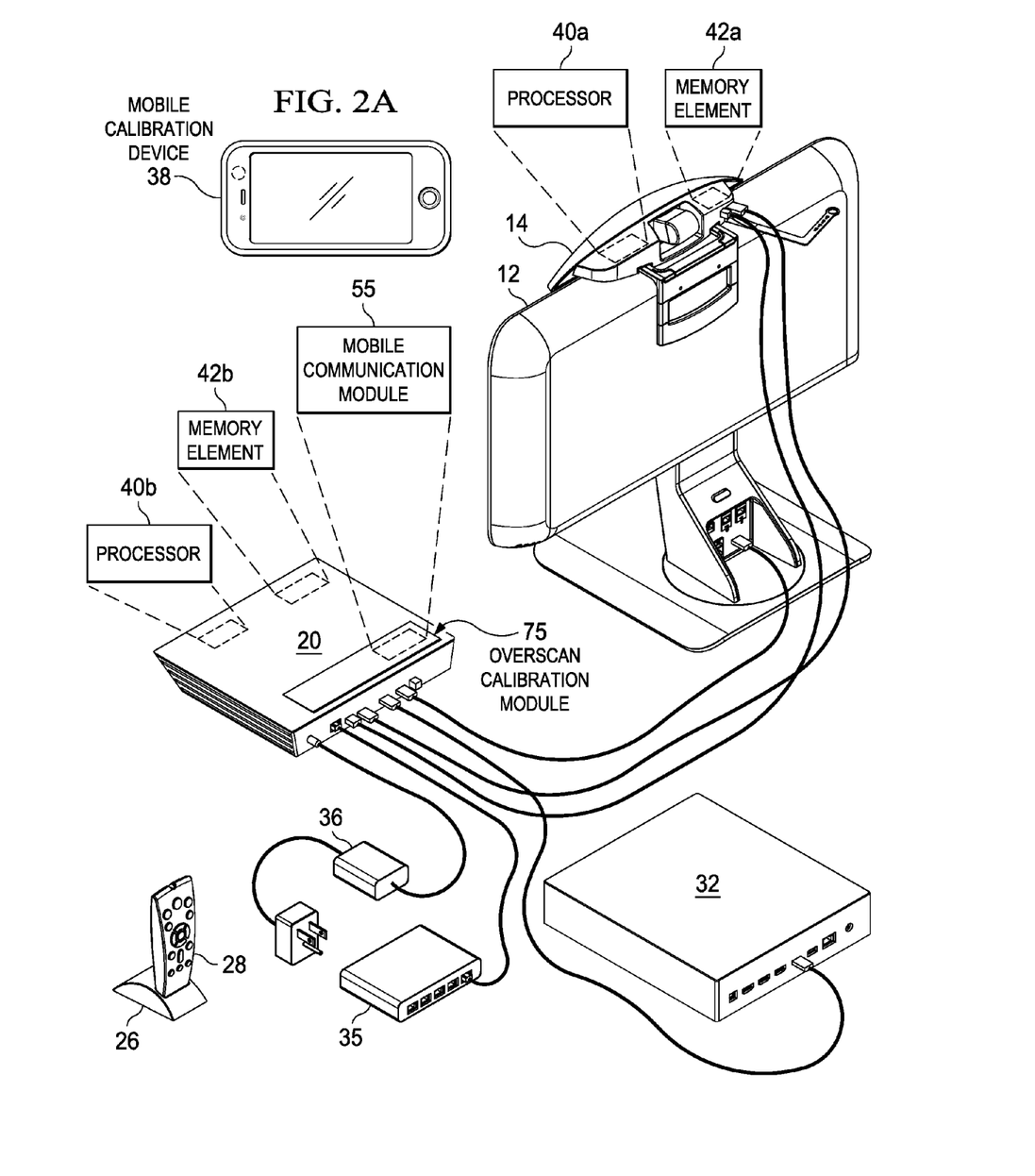
FIG. 2A is a simplified block diagram illustrating one example implementation of certain components associated with the system.

Turning to FIG. 2A, FIG. 2A is a simplified block diagram illustrating one possible set of details associated with system 10. FIG. 2A includes a mobile calibration device 38 and a console element 20, which includes a respective processor 40*b*, a respective memory element 42*b*, and an overscan calibration module 75. Overscan calibration module 75 is configured to determine the overscan amount such that the full (or approximately full) displayable area of display 12 may be used. Overscan calibration module 75 may include a mobile communication module 55 in particular implementations of the present disclosure.

Mobile communication module 55 is configured to communicate with mobile calibration device 38 via any suitable connections (wired or wireless) such as WiFi, Bluetooth, Ethernet cables, High-Definition Multimedia Interface (HDMI) cables, universal serial bus (USB) cables, or any other suitable link configured for carrying data or energy between two devices. Mobile calibration device 38 may be a cellphone, smartphone, personal digital assistant (PDA), or some other suitable handheld device that can be used to capture an image of display 12 and to communicate with overscan calibration module 75.

FIG. 2A further illustrates camera element 14, which may include a respective processor 40*a* and a respective memory element 42*a*. Camera element 14 is coupled to console element 20 in this particular example. A power cord 36 is provided between an outlet and console element 20. Any suitable connections (wired or wireless) can be used in order to connect any of the components of FIG. 2A. In certain examples, the cables used may include Ethernet cables, HDMI cables, universal serial bus (USB) cables, or any other suitable link configured for carrying data or energy between two devices.

In regards to a physical infrastructure, camera element 14 can be configured to fasten to any edge (e.g., a top edge) of display 12 (e.g., a flat-screen HD television). Camera element 14 can be included as part of an integrated component (i.e., a single component, a proprietary element, a set-top box, console element 20, etc.) that could include speakers 16 (e.g., an array microphone). All of these elements (camera element 14, speakers 16, console element 20) can be combined and/or be suitably consolidated into an integrated component that rests on (or that is fixed to, or that is positioned near) display 12. Alternatively, each of these elements may be their own separate devices that can be coupled (or simply interact with each other), or be adequately positioned in any appropriate fashion.

In addition, provided in FIG. 2A are a router 35 and a set-top box 32, both of which may be coupled to console element 20. In a particular example, router 35 can be a home wireless router configured for providing a connection to network 30. Alternatively, router 35 can employ a simple Ethernet cable in order to provide network connectivity for data transmissions associated with system 10. Handset 28 can be recharged through a cradle dock 26 (as depicted in FIG. 2A). [Handset 28 may be functional while docked.] Alternatively, handset 28 may be powered by batteries, solar charging, a cable, or by any power source, or any suitable combination of these mechanisms. In an embodiment, handset 28 can be configured to function as mobile calibration device 38. In such an implementation, handset 28 would include a display and an image-capturing functionality for achieving the teachings of the present disclosure, as discussed herein.

Figure 2B:
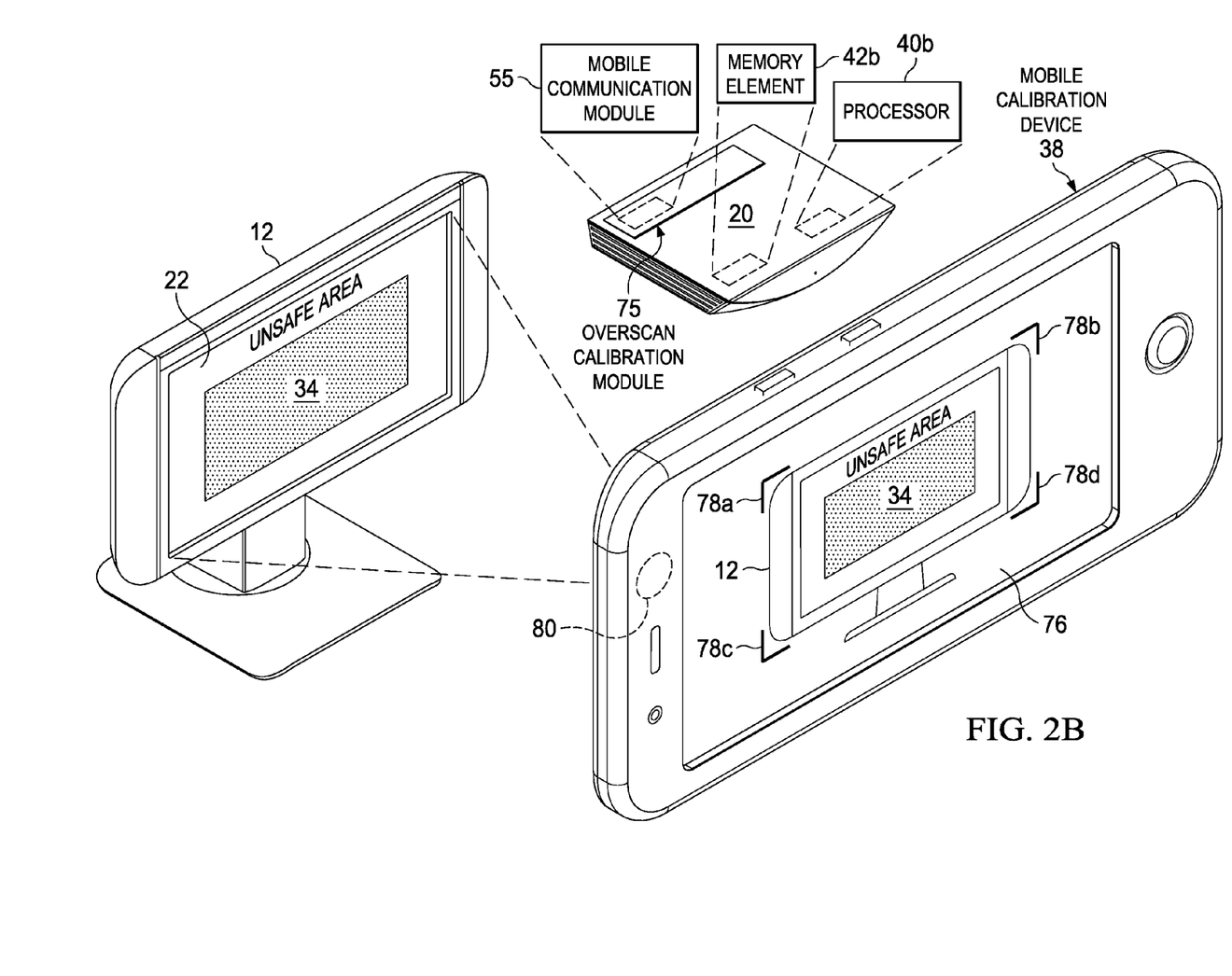
FIG. 2B is a simplified block diagram illustrating additional details of one example implementation of certain components associated with the system.

Turning to FIG. 2B, FIG. 2B is a simplified block diagram illustrating one possible embodiment of system 10. Display 12 contains a title unsafe area 22 and a calibration area 34. Because of the varying size of displayable area (due to the many differences in manufacturing tolerances and designs), title unsafe area 22 is the area content providers and set-top box manufacturers avoid for displaying important information on display 12 (i.e., so as not to risk the important information being cut-off). Mobile calibration device 38 includes a mobile display 76 and a camera 80 in this particular implementation.

In an embodiment, console element 20 uses overscan calibration module 75 to display title unsafe area 22 and calibration area 34 on display 12. Calibration area 34 and unsafe area 22 may be any color or pattern that would allow for the detection of title unsafe area 22 by mobile calibration device 38 or overscan calibration module 75. In a particular example, overscan calibration module 75 can display a black box in the center of display 12 (calibration area 34) over a magenta colored background (title unsafe area 22). Mobile calibration device 38 is pointed at display 12 and camera 80 is activated such that title unsafe area 22 and calibration area 34 displayed on display 12 are also displayed on mobile display 76.

In an embodiment, mobile calibration device 38 is moved or repositioned (e.g., closer to display 12 or further from display 12) until the display is within a set of guides 78*a*-78*d*. (Guides 78*a*-78*d* can help provide a uniform image of display 12 on mobile display 76.) While FIG. 2B illustrates the entire display 12 shown within guides 78*a*-78*d*, in an embodiment, the amount of actual physical frame displayed on mobile display 76 is minimized such that the area inside guides 78*a*-78*d* includes only a relatively small portion (if any) of the physical frame of display 12. For example, mobile calibration device 38 may be moved or repositioned until title unsafe area 22 (if present) is within guides 78*a*-78*d*, and a relatively small portion (if any) of the physical frame of display 12 would be present within guides 78*a*-78*d*.

Mobile calibration device 38 can use camera 80 to record an image of display 12. For example, mobile calibration device 38 may take frequent snapshots of display 12, or one snapshot of display 12. Mobile calibration device 38 analyzes the recorded image (or images) to determine if title unsafe area 22 is present in the recorded image (or images). For example, mobile calibration device 38 may search the recorded image for a magenta color (i.e., search for color ranges RGB(255,0,255) to RGB(240,0,240) to account for varying brightness). If title unsafe area 22 is present in the recorded image, then mobile calibration device 38 sends a signal to overscan calibration module 75 to incrementally increase the width and/or the height of calibration area 34 on display 12.

Subsequently, mobile calibration device 38 again uses camera 80 to record an image of display 12, where mobile calibration device 38 analyzes the recorded image to determine if title unsafe area 22 is present in the recorded image. If title unsafe area 22 is present in the recorded image, then mobile calibration device 38 sends a signal to overscan calibration module 75 to incrementally increase the width and/or the height of calibration area 34 on display 12. The process continues until title unsafe area 22 completely (or almost completely) disappears from display 12.

Once title unsafe area 22 has completely (or almost completely) disappeared from display 12, overscan calibration module 75 records the increase (or decrease) in size of calibration area 34 to determine the overscan scale factor. Set-top box 32 (or console element 20) is then considered to be 'visually calibrated' and overscan calibration module 75 can report the calibration scale factor to any service, application, or device that requests it. In an embodiment, applications or services may re-scale their output to display important visual information in the previously-vulnerable title unsafe area 22 of display 12.

Figure 2C:
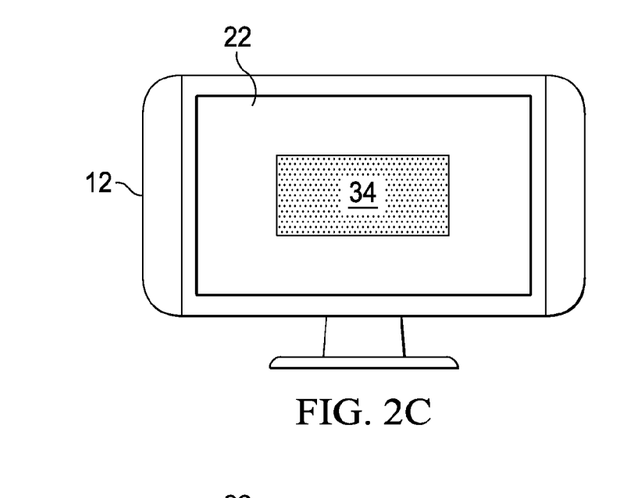
FIG. 2C is a simplified block diagram illustrating additional details of one example implementation of certain components associated with the system.
Figure 2D:
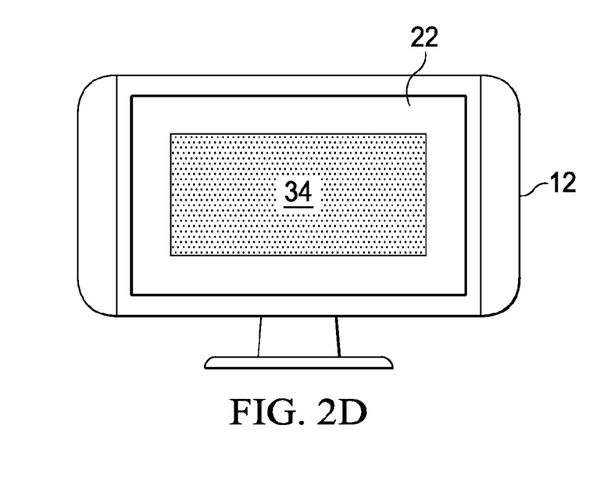
FIG. 2D is a simplified block diagram illustrating additional details of one example implementation of certain components associated with the system.

Turning to FIGS. 2C-2F, FIGS. 2C-2F illustrate increasing calibration area 34 until title unsafe area 22 completely (or almost completely) disappears from display 12. In FIG. 2C, the area of calibration area 34 is relatively small compared to the area of unsafe area 22. In a particular embodiment, mobile calibration device 38 can detect that the area of unsafe area 22 is relatively larger than the area of calibration area 34. In response, mobile calibration device 38 communicates to overscan calibration module 75 that calibration area 34 needs to be expanded by a large amount (i.e., incremented by a factor such that the area doubles or triples (or more) in size, exponentially incremented, etc.). In another embodiment, mobile calibration device 38 communicates to overscan calibration module 75 that unsafe area 22 is detectable, and overscan calibration module 75 increases calibration area 34 by a set amount. FIG. 2D illustrates after display 12 calibration area 34 has been expanded.

In an embodiment, mobile calibration device 38 may determine a percentage of display 12 that contains unsafe area 22. In another embodiment, mobile calibration device 38 may determine a ratio of the area of calibration area 34 over the area of unsafe area 22. There can be numerous methods and procedures for determining a relative amount of expansion/contraction of unsafe area 22 in relation to calibration area 34 and/or display 12 (e.g., linearly, logarithmically, exponentially, fractionally, etc.). Any such methods and procedures are clearly within the broad scope of the present disclosure, as discussed herein.

Figure 2E:
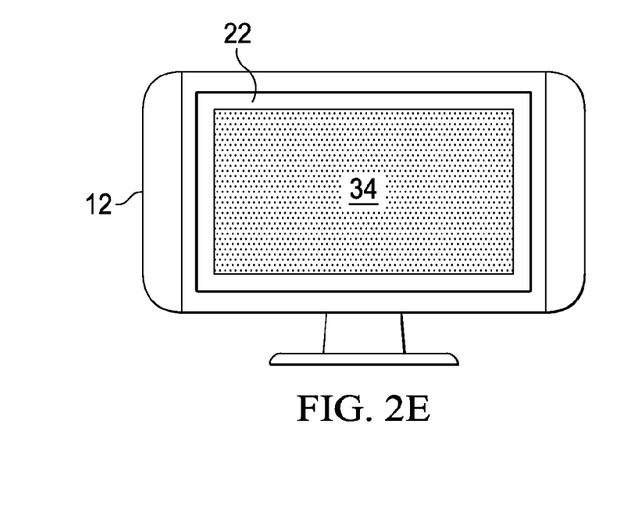
FIG. 2E is a simplified block diagram illustrating additional details of one example implementation of certain components associated with the system.

In FIG. 2D, the area of unsafe area 22 is about the same, if not less than the area of calibration area 34. In a particular embodiment, mobile calibration device 38 can detect that the area of unsafe area 22 is about the same, if not less than the area of calibration area 34. In response, mobile calibration device 38 communicates to overscan calibration module 75 that calibration area 34 needs to be expanded by a medium amount (i.e., incremented by a factor that is less than one). In another embodiment, mobile calibration device 38 communicates to overscan calibration module 75 that unsafe area 22 is detectable and overscan calibration module 75 increases calibration area 34 by a set amount. FIG. 2E illustrates display 12 after calibration area 34 has been expanded.

Figure 2F:
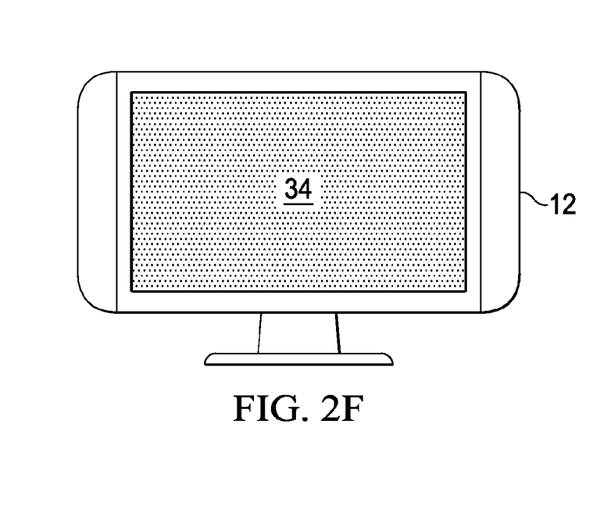
FIG. 2F is a simplified block diagram illustrating additional details of one example implementation of certain components associated with the system.

In FIG. 2E, the area of unsafe area 22 is relatively small compared to the area of calibration area 34. In a particular embodiment, mobile calibration device 38 can detect that the area of calibration area 34 is relatively larger than the area of unsafe area 22. In response, mobile calibration device 38 communicates to overscan calibration module 75 that calibration area 34 needs to be expanded by a small amount (i.e., incremented by a small fractional factor such that calibration area 34 increases only slightly). In another embodiment, mobile calibration device 38 communicates to overscan calibration module 75 that unsafe area 22 is detectable and overscan calibration module 75 increases calibration area 34 by a set amount. It should be readily understood that the set amount is small enough to incrementally increase calibration area 34 until calibration area 34 is at or near the edge of display 12. Note that consumer preferences can certainly be accommodated by system 10, where a given end user could readily configure default settings, preferences, etc. for managing the screen display activities discussed herein. FIG. 2F illustrates display 12 after calibration area 34 has been expanded. As illustrated, calibration area 34 is at or near the edge of display 12.

In an embodiment, unsafe area 22 may have an area less than two percent (2%) of display 12. In another embodiment, unsafe area 22 may have an area less than one percent (1%) of display 12. For example, unsafe area 22 shown in FIG. 2E may be less than two percent (2%) of display 12. In this example, calibration area 34 may not be increased because the next incremental increase of calibration area 34 may cause calibration area to be bigger than display 12, creating a risk that important information may be cut-off when being displayed.

Figure 2G:
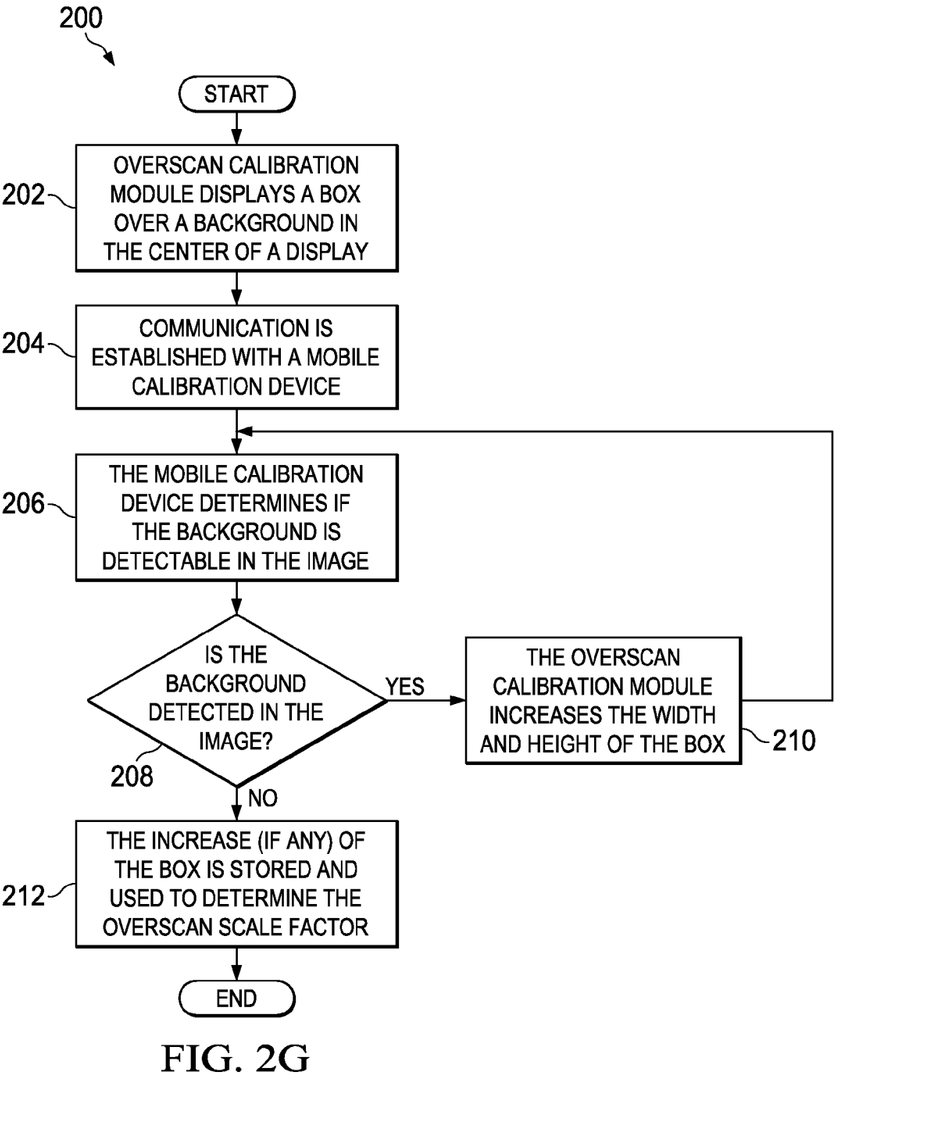
FIG. 2G is a simplified flow diagram illustrating potential operations associated with one embodiment of the present disclosure.

Turning to FIG. 2G, FIG. 2G is a simplified flowchart 200 illustrating example activities of calibrating a display. At 202, an overscan calibration module displays a box over a background in the center of a display. For example, overscan calibration module 75 may display calibration area 34 over unsafe area 22 on display 12. At 204, communication is established with a mobile calibration device. For example, overscan calibration module 75 may establish communication with mobile calibration device 38. At 206, the mobile calibration device determines if the background is detectable in the image. For example, mobile calibration device 38 may determine if unsafe area 22 is detectable in the image. In another embodiment, mobile calibration device 38 sends an image of display 12 to overscan calibration module 75, and overscan calibration module 75 determines if unsafe area 22 is detectable in the image.

At 208, if the background is detectable in the image, then the overscan calibration module increases the width and/or the height of the box, as in 210 and the mobile calibration device determines if the background is detectable in the image, as in 206. At 208, if the background is not detected in the image, then the increase (if any) of the box is stored and used to determine the overscan scale factor, as in 212.

Figure 2H:
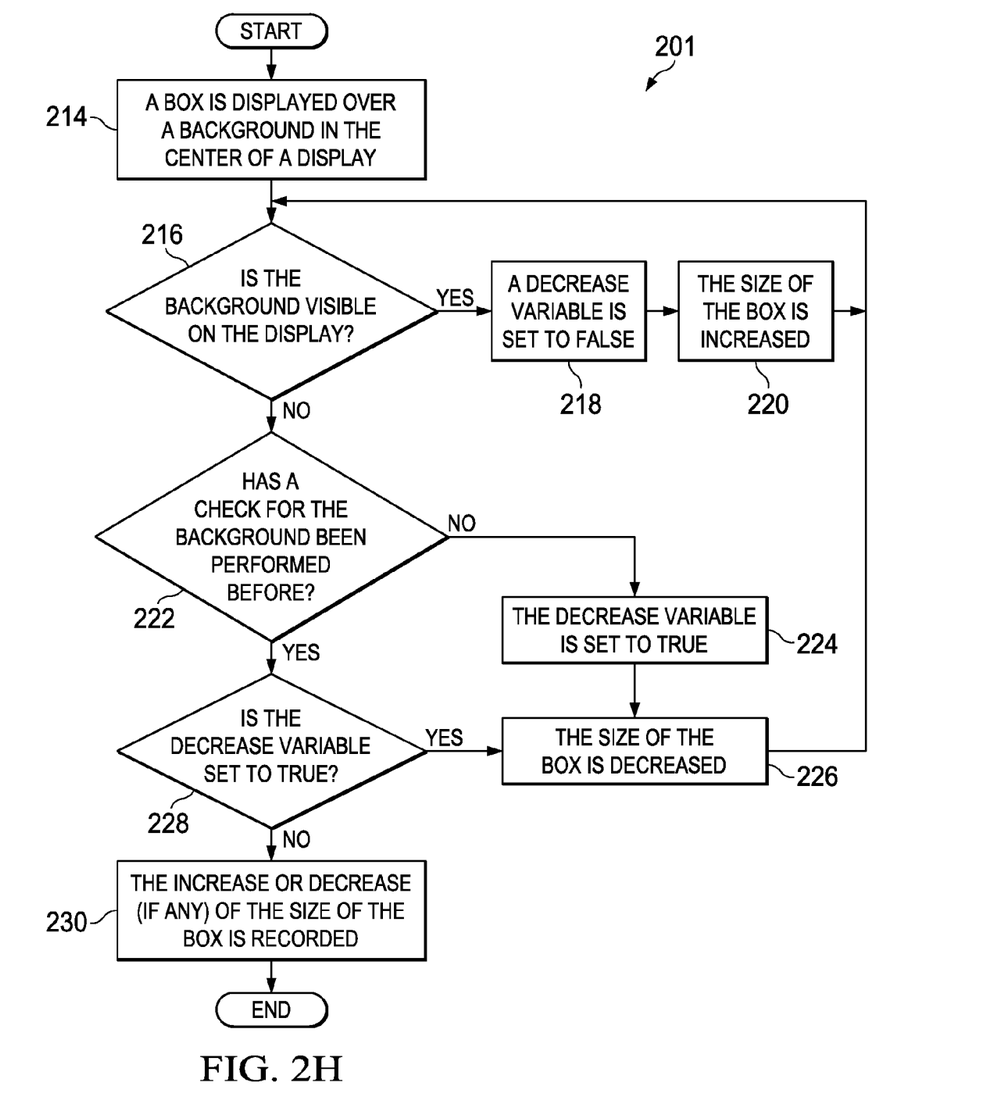
FIG. 2H is a simplified flow diagram illustrating potential operations associated with one embodiment of the present disclosure.

Turning to FIG. 2H, FIG. 2H is a simplified flowchart 201 illustrating example activities of calibrating display overscan using a mobile device. At 214, a box is displayed over a background in the center of a display. For example, calibration area 34 may be displayed over unsafe area 22 on display 12. At 216, the system determines if the background is visible on the display. For example, mobile calibration device 38 or overscan calibration module 75 may determine if unsafe area 22 is visible on display 12. If the background is visible on the display, then a decrease variable is set to "false", as in 218. At 220, the size of the box is increased and the system determines if the background is visible on the display, as in 216. For example, if unsafe area 22 is visible on display 12, then calibration area 34 may be increased by a set amount or by a factor (e.g., 0.1, 0.5, 2, 4, etc. . . . ).

If the background is not visible on the display, then the system determines if a check for the background has been performed before, as in 222. The system determines if a check for the background has been performed before because the size of the box (i.e., calibration area 34) may have started out too big and as a result, the size of the box will need to be reduced. If a check for the background has not been performed, then the decrease variable is set to "true", as in 224. At 226, the size of the box is decreased and the system determines if the background is visible on the display, as in 216.

If a check for the background has been performed, then the system determines if the decrease value is set to "true", as in 228. If the decrease value is set to "true" then the size of the box is decreased, as in 226, and the system determines if the background is visible on the display, as in 216. If the decrease value is not set to "true", then the increase or decrease (if any) of the size of the box is recorded, as in 230. For example, overscan calibration module 75 may record the increase or decrease in size of calibration area 34 to determine the overscan scale factor.

In operation of an example implementation, system 10 can be used to calibrate display overscan and conduct video calls (e.g., supporting both inbound and outbound directional call flows). For the inbound call scenario, on reception of an inbound call request, console element 20 is configured to contact the paired handset(s) 28 (e.g., waking it from sleep, where appropriate). Handset 28 can be configured to play a ringtone, turn on an LED indicator, and/or display UI 18 (e.g., including the incoming caller's contact information). If configured to do so, UI 18 can also be displayed over any passthrough video sources on console element 20. If the callee chooses to answer the call with one of the call control buttons, console element 20 offers its media capabilities to the caller's endpoint. In certain example implementations, by default, audio media can be offered at the start of the call. At any time during a voice call, both parties can agree to enter into a full video session (e.g., referred to as a "go big" protocol) at which point video media is negotiated. As a shortcut, the intention to "go big" can be pre-voted at the start of the call. At any time after video media is flowing, the call can also be de-escalated back to an audio-only call. In certain instances, there could be an option to automatically answer incoming calls as immediate full-video sessions.

In the case of an ad hoc outbound call, the user can select a callee from their contact list, select a callee via a speed dial setting, or alternatively the user can enter any type of identifier (e.g., a telephone number, a name, a videoconferencing (e.g., Telepresence, manufactured by Cisco, Inc. of San Jose, Calif.) number directly). If the callee answers, the call scenario proceeds, similar to that of an inbound call. In the case of a hold and resume scenario, an in-call UI 18 signal can be provided to put a call on hold, and subsequently the call can be resumed at a later time. Note that in other instances, system 10 can be used to execute scheduled calls, call transfer functions, multipoint calls, and/or various other conferencing capabilities.

In the case of the consumer user attempting a communication with a business entity, certain parameters may be changed based on interoperability issues. For example, secure business endpoints may be supported, where signaling and media would be secure (both audio and video). Appropriate messages can be displayed in UI 18 to inform the user of the reason for any security-forced call drops. Signaling can be considered secure by having both a business exchange and consumer networks physically co-located, or by using a secure tunnel (e.g., a site-to-site virtual private network (VPN) tunnel) between the two entities.

Turning to details associated with the call signaling of system 10, in one particular example, the call signaling can be provided by a session initiation protocol (SIP). In addition, the media for the video platform can be provided by Secure Real-time Transport Protocol (SRTP), or any other appropriate real-time protocol. SRTP addresses security for RTP and, further, can be configured to add confidentiality, message authentication, and replay protection to that protocol. SRTP is preferred for protecting voice over IP (VoIP) traffic because it can be used in conjunction with header compression and, further, it generally has no effect on IP quality of service (QoS). For network address translation (NAT)/firewall (FW) traversal, any suitable mechanism can be employed by system 10. In one particular example, these functions can be provided by a split-tunneled VPN with session traversal utilities for NAT (STUN) and Interactive Connectivity Establishment (ICE).

Signaling can propagate to a call agent via the VPN. Additionally, media can be sent directly from the endpoint to another endpoint (i.e., from one video platform to another). Note that as used herein, the term 'media' is inclusive of audio data (which may include voice data) and video data (which may include any type of image data). The video data can include any suitable images (such as that which is captured by camera element 14, by a counterparty's camera element, by a Webcam, by a smartphone, by an iPad, etc.). The term 'mobile device' as used herein includes any type of mobile component capable of operating in conjunction with a video service. This would naturally include items such as the Google Droid, the iPhone, an iPad, a mobile terminal, a mobile node, or any other suitable endpoint, etc. In addition, the term 'signaling data' is inclusive of any appropriate control information that can be sent toward a network. This may be inclusive of traffic used to establish a video session initially, along with any type of negotiations (e.g., for bit rates, for bandwidth, etc.) that may be appropriate for the particular video session. This may further be inclusive of items such as administrative traffic, account traffic (for user account management, contact lists [which include buddy lists, as detailed below], etc.), and/or other types of traffic, which are not provided as part of the media data.

In order to handle symmetric NAT, Traversal Using Relay NAT (TURN) can be used by system 10 in particular embodiments. User names for the video session can be provided by E.164 numbers in a particular example. Alternatively, the user naming can be a simple user ID (e.g., assigned by the service provider, selected by the user, etc.), a full name of the user (or a group name), an avatar, or any other symbol, number, or letter combination that can be used to distinguish one user from another. Note that a single name can also be associated with a group (e.g., a family, a business unit, etc.). The security for communications of system 10 can be addressed a number of ways. In one implementation, the video services (i.e., cloud services) can be protected by any suitable security protocol (e.g., security software, adaptive security appliances (ASA), etc.). Additionally, intrusion protection systems, firewalls, anti-denial of service mechanisms can be provided for the architecture (both out in the network, and/or locally within a residential environment).

Turning to details associated with the infrastructure of system 10, in one particular example, camera element 14 is a video camera configured to capture, record, maintain, cache, receive, and/or transmit image data. This could include transmitting packets over network 30 to a suitable next destination. The captured/recorded image data could be stored in camera element 14 itself, or be provided in some suitable storage area (e.g., a database, a server, console element 20, etc.). In one particular instance, camera element 14 can be its own separate network device and have a separate IP address. Camera element 14 could include a wireless camera, a high-definition camera, or any other suitable camera device configured to capture image data.

Camera element 14 may interact with (or be inclusive of) devices used to initiate a communication for a video session, such as a switch, console element 20, a proprietary endpoint, a microphone, a dial pad, a bridge, a telephone, a computer, or any other device, component, element, or object capable of initiating video, voice, audio, media, or data exchanges within system 10. Camera element 14 can also be configured to include a receiving module, a transmitting module, a processor, a memory, a network interface, a call initiation and acceptance facility such as a dial pad, one or more displays, etc. Any one or more of these items may be consolidated, combined, eliminated entirely, or varied considerably and those modifications may be made based on particular communication needs.

Camera element 14 can include a high-performance lens and an optical zoom, where camera element 14 is capable of performing panning and tilting operations. The video and the audio streams can be sent from camera element 14 to console element 20, where they are mixed into the HDMI stream. In certain implementations, camera element 14 can be provisioned as a light sensor such that the architecture can detect whether the shutter of the camera is open or closed (or whether the shutter is partially open.) An application program interface (API) can be used to control the operations of camera element 14.

Display 12 offers a screen on which video data can be rendered for the end user. Note that as used herein in this Specification, the term 'display' is meant to connote any element that is capable of delivering image data (inclusive of video information), text, sound, audiovisual data, etc. to an end user. This would necessarily be inclusive of any panel, plasma element, television (which may be high-definition), monitor, computer interface, screen, Telepresence devices (inclusive of Telepresence boards, panels, screens, surfaces, etc.), or any other suitable element that is capable of delivering/rendering/projecting such information.

In certain implementations, mobile calibration device 38 (and/or handset 28) can be used as a remote control for system 10. For example, mobile calibration device 38 can offer a wireless remote control that allows it to communicate with display 12, camera element 14, and/or console element 20 via a wireless network link (e.g., infrared, Bluetooth, any type of IEEE 802.11-based protocol, etc.). Mobile calibration device 38 can further be provisioned as a wireless mobile phone (e.g., a speakerphone device) with various dial pads: some of which are shown by way of example in FIG. 1. In other implementations, mobile calibration device 38 operates as a learning mechanism and/or a universal remote controller, which allows it to readily control display 12, camera element 14, console element 20, and/or any audiovisual (AV) receiver device (e.g., managing functions such as ON/OFF, volume, input select, etc. to enhance the overall video experience). In a particular set of examples, a specific button on mobile calibration device 38 can launch UI 18 for navigating through any number of options provided in submenus of the UI software. Additionally, a dedicated button can be used to make/answer calls, end calls, turn on/off camera element 14, turn on/off the microphone on, turn on/off console element 20, etc. Furthermore, a set of playback controls can be provided on mobile calibration device 38 in order to control the video data being rendered on display 12.

Note that mobile calibration device 38 (and/or handset 28) can be configured to launch, control, and/or manage UI 18. In one particular instance, UI 18 includes a clover design having four separate functions along its perimeter (i.e., up, down, left, right). The center of UI 18 can be used to initiate calls or to configure call options. The lower widget icon may be used to adjust settings, inclusive of controlling profile information, privacy settings, console settings, etc. The right-hand icon (when selected) can be used to view video messages sent to a particular user. The upper icon can be used to manage contacts (e.g., add, view, and connect to other individuals). The director's card (provided as the left icon) can be used to record and send video messages to other individuals. It is imperative to note that these menu choices can be changed considerably without departing from the scope of the present disclosure. Additionally, these icons may be customized, changed, or managed in any suitable fashion. Furthermore, the icons of UI 18 are not exhaustive, as any other suitable features may be provided in the context of UI 18. Along similar lines, the submenu navigation choices provided beneath each of these icons can include any suitable parameter applicable to video applications, networking, user data management, profiles, etc.

Network 30 represents a series of points or nodes of interconnected communication paths for receiving and transmitting packets of information that propagate through system 10. Network 30 offers a communicative interface between any of the components of FIGS. 1 and 2A and remote sites, and may be any local area network (LAN), wireless local area network (WLAN), metropolitan area network (MAN), wide area network (WAN), VPN, Intranet, Extranet, or any other appropriate architecture or system that facilitates communications in a network environment.

Console element 20 is configured to receive information from camera element 14 (e.g., via some connection that may attach to an integrated device (e.g., a set-top box, a proprietary box, etc.) that sits atop (or near) display 12 and that includes (or is part of) camera element 14). Console element 20 may also be configured to control compression activities, or additional processing associated with data received from camera element 14. Alternatively, the actual integrated device can perform this additional processing before image data is sent to its next intended destination. Console element 20 can also be configured to store, aggregate, process, export, or otherwise maintain image data and logs in any appropriate format, where these activities can involve processor 40b and memory element 42b. Console element 20 is a video element that facilitates data flows between endpoints and a given network. As used herein in this Specification, the term 'video element' is meant to encompass servers, proprietary boxes, network appliances, set-top boxes, or other suitable device, component, element, or object operable to exchange video information with camera element 14.

Console element 20 may interface with camera element 14 and mobile calibration device 38 through a wireless connection, or via one or more cables or wires that allow for the propagation of signals between these elements. These devices can also receive signals from an intermediary device, a remote control, handset 28, mobile calibration device 38, etc. and the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between console element 20, mobile calibration device 38, and camera element 14. Transmissions between these devices can be bidirectional in certain embodiments such that the devices can interact with each other. This would allow the devices to acknowledge transmissions from each other and offer feedback where appropriate. Any of these devices can be consolidated with each other, or operate independently based on particular configuration needs. In one particular instance, camera element 14 is intelligently powered using a USB cable. In a more specific example, video data is transmitted over an HDMI link, and control data is communicated over a USB link.

In certain examples, console element 20 can have an independent light sensor provisioned within it to measure the lighting in a given room. Subsequently, the architecture can adjust camera exposure, shuttering, lens adjustments, etc. based on the light that is detected in the room. Camera element 14 is also attempting to provide this function; however, having a separate light sensor offers a more deterministic way of adjusting these parameters based on the light that is sensed in the room. An algorithm (e.g., within camera element 14 and/or console element 20) can be executed to make camera adjustments based on light detection. In an IDLE mode, the lens of camera element 14 can close automatically. The lens of camera element 14 can open for an incoming call, and can close when the call is completed (or these operations may be controlled by handset 28). The architecture can also account for challenging lighting environments for camera element 14. For example, in the case of bright sunlight behind an individual, system 10 can optimize the exposure of the individual's face.

In regards to audio data (inclusive of voice data), in one particular example, speakers 16 are provisioned as a microphone array, which can be suitably calibrated. Note that in certain consumer applications, the consumer's home system is the variant, which is in contrast to most enterprise systems that have fixed (predictable) office structures. Camera element 14 can include an array of eight microphones in a particular example, but alternatively any number of microphones can be provisioned to suitably capture audio data. The microphones can be spaced linearly, or logarithmically in order to achieve a desired audio capture function. MicroElectrical-Mechanical System (MEMS) technology can be employed for each microphone in certain implementations. The MEMS microphones represent variations of the condenser microphone design, having a built in analog-to-digital converter (ADC) circuits.

The audio mechanisms of system 10 can be configured to add a delay to the system in order to ensure that the acoustics function properly. In essence, the video architecture does not inherently know the appropriate delay because of the unique domain of the consumer. For example, there could be a home theater system being used for acoustic purposes. Hence, system 10 can determine the proper delay, which would be unique to that particular environment. In one particular instance, the delay can be measured, where the echoing effects from the existing speakers are suitably canceled. An embedded watermarking signature can also be provided in each of the speakers, where the signature can be detected in order to determine an appropriate delay. Note that there is also some additional delay added by display 12 itself because the clocking mechanism is generally not deterministic. The architecture can dynamically update the delay to account for this issue. Many of these functions can be accomplished by console element 20 and/or camera element 14: both of which can be intelligently configured for performing these function adjustments.

The architecture can also send out a signal (e.g., white noise) as a test for measuring delay. In certain instances, this function is done automatically without having to prompt the user. The architecture can also employ wireless microphone 24, which can use a dedicated link in certain implementations. Wireless microphone 24 can be paired (akin to Bluetooth pairing) such that privacy issues can be suitably addressed. Wireless microphone 24 can be taken anywhere (e.g., in the room, in the house, etc.) and still provide appropriate audio functions, where multiplexing would occur at console element 20 for this particular application. Similarly, there could be an incarnation of the same for a given speaker (or the speaker/microphone can be provided together as a mobile unit, which is portable). The speaker could be similarly used anywhere in the room, in the house, etc. It should be noted that this is not only a convenience issue, but also a performance issue in suitably capturing/delivering audio signals having the proper strength and quality.

In terms of call answering and video messaging, handset 28 allows an individual to have the option of taking a voice call instead of answering a video call. This is because handset 28 can have the intelligence to operate purely as a mobile phone. For this reason, handset 28 can readily be substituted/replaced by various types of smartphones, which could have an application provisioned thereon for controlling the video activities. Handset 28 also affords the ability to be notified (through the handset itself) of an incoming video call, with the option of rendering that call on display 12. A simple visual alert (e.g., an LED, a vibration, etc.) can be used to indicate a video message is waiting to be heard/watched.

The video messaging can include snapshots of video frames that would be indicative of the actual message images. In the user's video Inbox, the current videomail can include images of the actual messages being stored for future playback. For example, if the message were from the user's mother, the videomail would include a series of snapshots of the mother speaking during that videomail. In one particular example, the actual videomail is sampled at certain time intervals (e.g., every 10 seconds) in order to generate these images, which serve as a preview of the videomail message. Alternatively, the snapshots can be limited in number. In other instances, the snapshots are arbitrarily chosen, or selected at the beginning, the middle, and the end of the video message. In other implementations, the snapshots are taken as a percentage of the entire video message (e.g., at the 20% mark, at the 40% mark, and at the 100% mark). In other examples, the videomail in the Inbox is previewed by just showing the image associated with that particular user ID that authored the video message.

In operation of an example involving a user watching a normal television program on display 12, an incoming call can be received by the video platform. The notification can arrive even if the television is off (e.g., through speakers of system 10). If an individual chooses to answer the call, then the video platform takes over the television. In one example involving a digital video recorder (DVR), the programming can be paused. In other examples, the user can keep the call minimized so (for example) a user could speak with a friend while watching a football game. Console element 20 can be configured to record a message, and then send that message to any suitable next destination. For example, the user can send a link to someone for a particular message. The user can also use Flip Share or YouTube technology to upload/send a message to any appropriate destination. In a general sense, the messages can be resident in a network cloud such that they could still be accessed (e.g., over a wireless link) even if the power were down at the residence, or if the user were not at the residence.

The user can also switch from a video call to handset 28, and from handset 28 back to a video call. For example, the user can initiate a call on a smartphone and subsequently transition it to the video display. The user can also do the reverse, where the user starts at the video platform and switches to a smartphone. Note that wireless microphone 24 can operate in a certain, preferred range (e.g., 12 to 15 feet), where if the individual moves further away from that range, users could elect to transition to handset 28 (in a more conventional telephony manner). Consider the case where the room becomes noisy due to family members, and the user on the video call elects to simply switch over to a smartphone, to a given landline, etc.

Motion detection can also be used in order to initiate, or to answer video calls. For example, in the case where a remote control is difficult to find in a living room, a simple handwaving gesture could be used to answer an incoming video call. Additionally, the system (e.g., camera element 14 cooperating with console element 20) can generally detect particular body parts in order to execute this protocol. For example, the architecture can distinguish between a dog running past display 12, versus handwaving being used to answer an incoming call. Along similar lines, the user can use different gestures to perform different call functions (e.g., clasping his hands to put a call on hold, clapping his hands to end the call, pointing in order to add a person to a contact list, etc.).

Note that Wi-Fi is fully supported by system 10. In most video scenarios, there can be massive amounts of data (much of which is time critical) propagating into (or out of) the architecture. Video packets (i.e., low-latency data) propagating over a Wi-Fi connection can be properly accommodated by system 10. In one particular example, nonmoving (static) background images can be segmented out of the video image, which is being rendered by display 12. The architecture (e.g., through console element 20) can then lower the bit rate significantly on those images. Allocations can then be made for other images that are moving (i.e., changing in some way). In certain example implementations, face-detection algorithms can also be employed, where the video is optimized based on those algorithm results.

Certain phone features allow for handset 28 to offer speed dialing, and a mechanism for saving contacts into a contact list. Calls can be made to users on the speed dial list or the contact list with a single button push on handset 28. Additionally, calls can be initiated using either the UI of handset 28, or the on-screen UI 18. Furthermore, calls can be initiated from a web portal, where the caller can confirm call initiation at the endpoint by pressing voice-only, or a video call button on handset 28. Also, calls can be initiated from other web pages via a call widget (e.g., calling a person by clicking on his Facebook object). In addition, the caller can look up a recipient in an online directory (e.g., a directory of all Telepresence users stored in a database), place a call to that recipient, and save the recipient's contact information into the contact list. In terms of receiving video calls, incoming calls can be accepted with a single button push on handset 28. Call recipients have the opportunity to accept or reject a call. Rejected calls can be routed to videomail (if permitted by the recipient's safety settings).

In regards to call quality, if the available bandwidth decreases during a call, the video resolution is scaled down, as appropriate. If the available bandwidth increases during a call, the video resolution can be scaled up. An on-screen icon can be provided on display 12 to inform the user of the quality of his video experience. The purpose of this information can be to inform the user of a poor experience, potentially being caused by network conditions, and that the user can improve his experience by upgrading his broadband service. When communicating with a Webcam, the picture on display 12 can be windowed inside a black frame: regardless of the actual quality of the Webcam video.

In regards to videomail, when a call cannot be answered in real time, it is not lost, but rather, forwarded automatically to videomail. Videomail can be accessed from the video system, a web portal, a smartphone, laptop, or any other suitable endpoint device to be used by a user. Note that the user is afforded the ability to set a designated interval for when an incoming counterparty would be relegated to the user's videomail Inbox. The term 'designated interval' is inclusive of a number of rings, a certain time period (e.g., in seconds), or a zero interval, in which case the counterparty's video call request would be immediately routed to the user's videomail.

In certain embodiments, the 'designated interval' has a default configured by an administrator.

Videomail can be stored in the network (e.g., in the cloud) in particular implementations of system 10. Alternatively, the videomail can be stored locally at the consumer's residence (e.g., at a laptop, a personal computer, an external hard drive, a server, or in any other appropriate data storage device). Videomail can be played with the following minimum set of playback controls: Play, Pause, Stop, Fast or Skip Forward, Fast or Skip Reverse, Go Back to Start. In a particular implementation, videomail is only viewed by the intended recipient. Notifications of new videomail can be sent to other devices by short message service (SMS) text message (e.g., to a mobile device) or by email. An immediate notification can also be shown on handset 28. For video recordings, videos can be recorded and stored in the network for future viewing and distribution. Calls can similarly be recorded in real time and stored in the network for future viewing and distribution. When sharing recorded videos with other video users, the architecture can specify exactly which video users have access to the video data. When the share list contains one or more email addresses, access control is not enabled in particular implementations (e.g., any individual who has the URL could access the video).

In terms of media sharing, system 10 can provide a simple mechanism for sharing digital photos and videos with removable flash media, flash and hard-drive high definition digital camcorders, digital still cameras, and other portable storage devices. This can be fostered by supporting an external USB connection for these devices to the USB port, which can be provisioned at console element 20, display 12, camera element 14, a proprietary device, or at any other suitable location.

The media sharing application (e.g., resident in console element 20) supports playback of compressed AV file media that is stored on the USB device. Furthermore, this media sharing can be supported via an external HDMI connection for these devices to the HDMI port. System 10 can also provide a mechanism for sharing digital photos and videos that are on a computer, on a Network Attached Storage (NAS) device, on the local network, etc. The mechanism can be universal plug and play (UPnP)/digital living network alliance (DLNA) renderer compliant. The media sharing application can also provide a mechanism for sharing digital photos and videos that are on either a photo or video sharing site (e.g., Flickr, YouTube, etc.), as discussed herein.

System 10 can also provide a mechanism for viewing broadcast HDTV programs (e.g., watching the Superbowl) with the HDTV set-top box HDMI AV feed displayed in picture-in-picture (PIP) with the call video. Continuing with this example, the Super Bowl broadcast feed can be from a local set-top box 32 and not be shared. Only the call video and voice would be shared in this example. The audio portion of the call can be redirected to handset 28 (e.g., speakerphone by default). The audio from the local TV can be passed through to HDMI and optical links (e.g., TOSlink outputs).

In an example scenario, initially the game video can fill the main screen and the call video could be in the smaller PIP. The audio for the game can pass through the box to the television, or to AV receiver surround-sound system. The audio for the video call would be supported by handset 28. In a different scenario, while watching the game, where one caller prefers to switch the main screen from the game to the video call (e.g., during halftime), then the following activities would occur. [Note that this is consistent with the other PIP experiences.] The call video can fill the main screen, where the game fills the smaller PIP window. The audio for the video call can move to the TV or to the AV receiver surround-sound system, and the game audio can switch to handset 28. Note that none of these activities requires the user to be "off camera" to control the experience: meaning, the user would not have to leave his couch in order to control/coordinate all of these activities.

In one particular example, console element 20 and camera element 14 can support any suitable frame rate (e.g., a 50-60 frames/second (fps) rate) for HD video for local, uncompressed inputs and outputs. Additionally, the video (e.g., the HDMI 1.3 video) can be provided as a digital signal input/output for local, uncompressed inputs and outputs. There is a passthrough for high-bandwidth Digital Content Protection (HDCP) data for local, uncompressed inputs and outputs from HDMI.

In regards to audio support, HDMI audio can be provided as a digital signal input/output. There can also be a stereo analog line-level output to support legacy devices in the environment. This is in addition to a digital audio output, which may be in the form of an optical link output such as a TOSlink output. For the audiovisual switching activities, audio and video can be patched from inputs, videoconferencing video, or other generated sources, to a local full-screen output. The architecture can offer a protocol for automatically turning on and selecting the correct source of the HDTV (along with any external audio system, when the audiovisual configuration allows for this while answering a call). This feature (and the other features of handset 28) can be implemented via infrared, Bluetooth, any form of the IEEE 802.11 protocol, HDMI-Consumer Electronics Control (CEC), etc.

In regards to camera element 14, the architecture can provide a full-motion video (e.g., at 30 fps). Participants outside of the range may be brought into focus via autofocus. Camera element 14 can provide identification information to console element 20, a set-top satellite, and/or any other suitable device regarding its capabilities. Camera element 14 can be provisioned with any suitable pixel resolution (e.g., 1280× 720 pixel (720p) resolution, 1920×1080 pixel (1080p) resolution, etc.). If depth of focus is greater than or equal to two meters, then manual focus can be suggested for setup activities, and the autofocus feature/option would be desirable for the user. In operation, the user can manually focus camera element 14 on his sofa (or to any other target area) during setup. If successful, this issue would not have to be revisited. If depth of focus is less than or equal to one meter (which is commonly the case) then autofocus can be implemented. A digital people-action finder may also be provisioned for system 10 using camera element 14. Both pan and tilt features are available manually at setup, and during a video call. Similarly, zoom is available manually at set-up time, and during a video call.

Handset 28 may be equipped with any suitable microphone. In one particular implementation, the microphone is a mono-channel mouthpiece microphone optimized for capturing high quality audio in a voice range. The microphone may be placed to optimize audio capture with standard ear-mouth distance. Handset 28 can have a 3.5 mm jack for a headphone with microphone. Note that system 10 can support Home Network Administration Protocol (HNAP) and, further, be compatible with Network Magic, Linksys Easy-Link Advisor, or any other suitable home network management tool.

In one example, handset 28 has an infrared transmitter for controlling standard home theatre components. The minimum controls for handset 28 in this example can be power-on, input select, volume up/down, and audio output mute of the TV and AV receiver. Console element 20 (along with camera element 14) can have an infrared receiver to facilitate pairing of the video system with other remote controls, which can allow other remotes to control the video system. Suitable pairing can occur either by entering infrared codes into handset 28, or by pointing a remote from the target system at an infrared receiver of the video system (e.g., similar to how universal remotes learn and are paired).

For call management, system 10 can allow a user to initiate, accept, and disconnect calls to and from voice-only telephones (e.g., using handset 28 in a voice-only mode). Call forwarding can also be provided such that video calls are forwarded between console elements 20 at each endpoint of the video session. Additionally, announcements can be provided such that a default announcement video can be played to callers who are leaving a videomail. A self-view is available at any time, and the self-view can be triggered through a user demand by the user pressing a button on handset 28. The self-view can be supported with a mirror mode that shows the reverse image of the camera, as if the user was looking in a mirror. This can occur at any time, including while idle, while on a video call, while on an audio-only call, etc.

Figure 3:
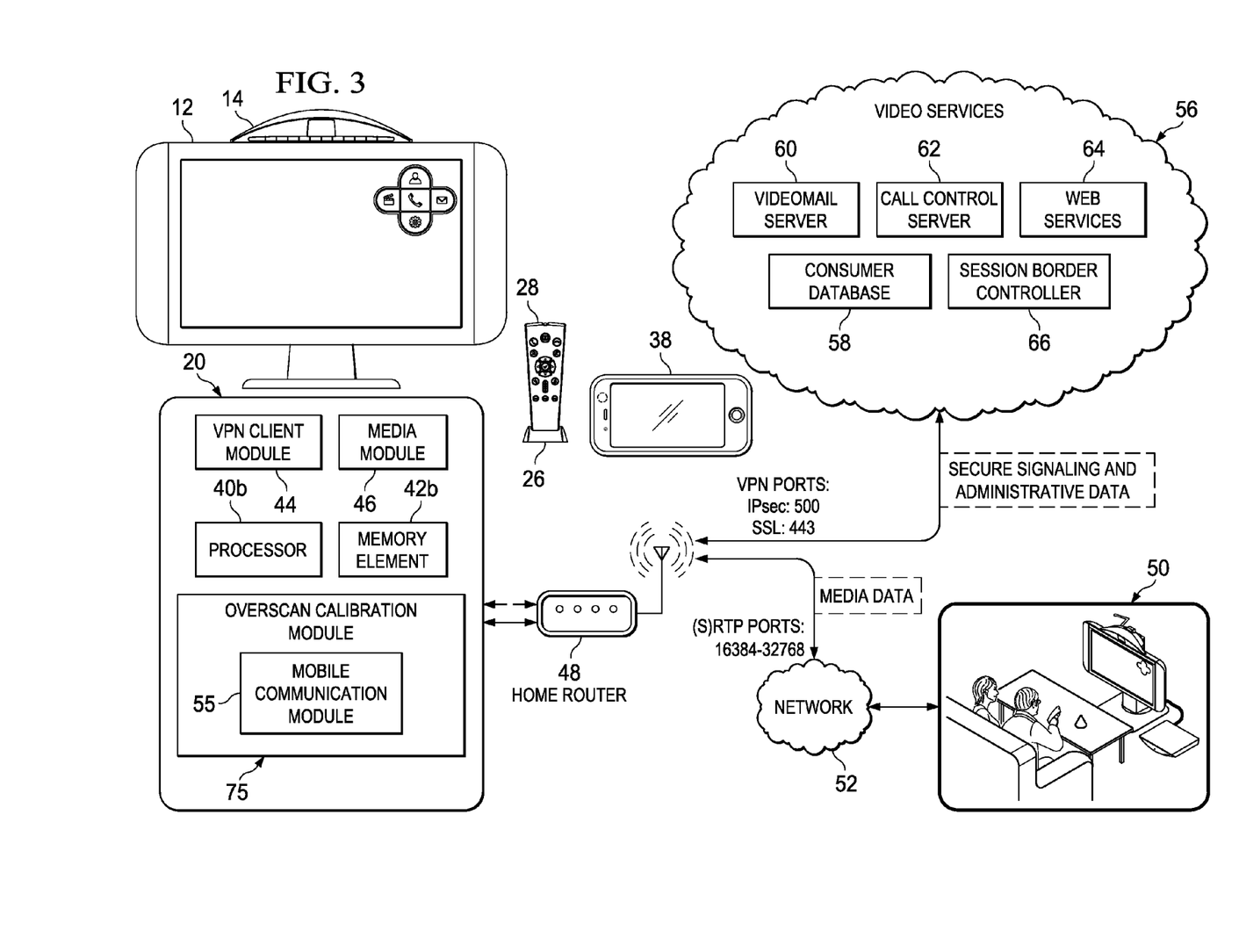
FIG. 3 is a simplified block diagram illustrating one example implementation of certain components associated with the system.

FIG. 3 is a simplified block diagram illustrating one potential operation associated with system 10. In this particular implementation, console element 20 is provisioned with a VPN client module 44, and a media module 46. Console element 20 is coupled to a home router 48, which can provide connectivity to another video endpoint 50 via a network 52. Home router 48 can also provide connectivity to a network that includes a number of video services 56. In this example, video services 56 include a consumer database 58, a videomail server 60 a call control server 62, a web services 64, and a session border controller 66.

Any number of traffic management features can be supported by system 10. In a simple example, system 10 can allow a point-to-point connection to be made between two home video conferencing systems. A connection can also be made between a home video conferencing system and an enterprise video system. The packets associated with the call may be routed through a home router, which can direct the packets to an exchange or a gateway in the network. The consumer endpoint does not need to support the second data channel; any shared content can be merged into the main data stream. A multipoint connection can be made between a combination of three or more home and enterprise video systems.

In operation, the VPN is leveraged in order to transmit administrative and signaling traffic to the network. Additionally, the media data (e.g., voice and video) can be exchanged outside of that link (e.g., it can be provisioned to flow over a high bandwidth point-to-point link). This linking can be configured to protect administrative and signaling traffic (which may be inclusive of downloads), while simultaneously conducting high-speed data communications over the point-to-point pathway.

In the particular example of FIG. 3, secure signaling and administrative data is depicted as propagating between home router 48 and video services 56. A number of VPN ports are also illustrated in FIG. 3. The ports can be associated with any appropriate security protocol (e.g., associated with IPsec, secure socket layer (SSL), etc.). Additionally, media data can propagate between network 52 and home router 48, where RTP ports are being provisioned for this particular exchange involving a counterparty endpoint 50. Semantically, multiple pathways can be used to carry the traffic associated with system 10. In contrast to other applications that bundle their traffic (i.e., provide a single hole into the firewall), certain implementations of system 10 can employ two different pathways in the firewall: two pathways for carrying two different types of data.

The objects within video services 56 are network elements that route or that switch (or that cooperate with each other in order to route or switch) traffic and/or packets in a network environment. As used herein in this Specification, the term 'network element' is meant to encompass servers, switches, routers, gateways, bridges, loadbalancers, firewalls, inline service nodes, proxies, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information.

Note that videomail server 60 may share (or coordinate) certain processing operations between any of the elements of video services 56. Using a similar rationale, their respective memory elements may store, maintain, and/or update data in any number of possible manners. In one example implementation, videomail server 60 can include software to achieve the display calibration applications, as described herein. In other embodiments, these features may be provided externally to any of the aforementioned elements, or included in some other network element to achieve this intended functionality. Alternatively, several elements (e.g., console 20 and mobile calibration device 38) may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these switching operations.

In certain instances, videomail 60 can be provisioned in a different location, or some other functionalities can be provided directly within the video platform (e.g., within console element 20, camera element 14, display 12, etc.). This could be the case in scenarios in which console element 20 has been provisioned with increased intelligence to perform similar tasks, or to manage certain repositories of data for the benefit of the individual user.

Note that in certain example implementations, the display calibration functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or any other similar machine, etc.). In some of these instances, memory elements [as shown in FIGS. 2A, 2B, and 3] can store data used for the display calibration operations described herein (e.g., any increase or decrease of calibration area 34, the overscan scale factor, etc.). This includes the memory element being able to store instructions (e.g., software, logic, code, etc.) that are executed to carry out the activities described in this Specification. A processor can execute any type of instructions associated with the data to achieve the operations detailed herein in this Specification. In one example, the processors [as shown in FIGS. 2A, 2B, and 3] could transform an element or an article (e.g., data) from one state or thing to another state or thing. In another example, the display calibration activities outlined herein may be implemented with fixed logic or programmable logic (e.g., software/computer instructions executed by a processor) and the elements identified herein could be some type of a programmable processor, programmable digital logic (e.g., FPGA, an erasable programmable read only memory (EPROM), an electrically erasable programmable ROM (EEPROM)) or an ASIC that includes digital logic, software, code, electronic instructions, or any suitable combination thereof.

Note that the equipment of FIGS. 2A, 2B, and 3 may share (or coordinate) certain processing operations. Using a similar rationale, their respective memory elements may store, maintain, and/or update data in any number of possible manners. In a general sense, the arrangements depicted in the preceding FIGURES may be more logical in their representations, whereas a physical architecture may include various permutations/combinations/hybrids of these elements. In one example implementation, console element 20 includes software (e.g., as part of the modules of FIGS. 2A, 2B, and 3) to achieve the display calibration operations, as outlined herein in this document. In other embodiments, these features may be provided externally to any of the aforementioned elements (e.g., included in mobile calibration device 38 or camera element 14), or included in some other device to achieve these functionalities. Alternatively, several elements may include software (or reciprocating software) that can coordinate in order to achieve the operations, as outlined herein. In still other embodiments, any of the devices of the FIGURES may include any suitable algorithms, hardware, software, components, modules, interfaces, or objects that facilitate these display calibration operations.

All of the aforementioned devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., database, table, key, queue, etc.) should be construed as being encompassed within the broad term 'memory element.' Similarly, any of the potential processing elements, modules, and machines described in this Specification should be construed as being encompassed within the broad term 'processor.' Console element 20, mobile calibration device 38, and/or camera element 14 can also include suitable interfaces for receiving, transmitting, and/or otherwise communicating data or information in a network environment.

Note that with the examples provided herein, interaction may be described in terms of two, three, or four elements. However, this has been done for purposes of clarity and example only. In certain cases, it may be easier to describe one or more of the functionalities of a given set of flows by only referencing a limited number of elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain server components, system 10 may be applicable to other protocols and arrangements (e.g., those involving any type of video scenarios). Additionally, although camera element 14 has been described as being mounted in a particular fashion, camera element 14 could be mounted in any suitable manner in order to suitably capture video images. Other configurations could include suitable wall mountings, aisle mountings, furniture mountings, cabinet mountings, upright (standing) assemblies, etc., or arrangements in which cameras would be appropriately spaced or positioned to perform its functions.

Moreover, although the previous discussions have focused on video associated with particular types of mobile devices, handheld devices that employ video applications could readily adopt the teachings of the present disclosure. For example, iPhones, iPads, Google Droids, personal computing applications (i.e., Desktop video solutions), etc. can readily adopt and use the enhanced display calibration operations detailed above. Any communication system or device that encodes or renders video data would be amenable to the video features discussed herein.

Additionally, system 10 can involve different types of counterparties, where there can be asymmetry in the technologies being employed by the individuals. For example, one user may be using a laptop, while another user is using the architecture of system 10. Similarly, a smartphone could be used as one individual endpoint, while another user continues to use the architecture of system 10. Also, Webcams can readily be used in conjunction with system 10. Along similar lines, multiparty calls can readily be achieved using the teachings of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method implemented by an apparatus, the method comprising:
    displaying a calibration area surrounded by a background on a display;
    analyzing an image of the display to determine a ratio of an area of the calibration area to an area of the background;
    expanding the calibration area by a factor greater than one, if the ratio of the area of the calibration area to the area of the background is less than one;
    expanding the calibration area by a factor less than one, if the ratio of the area of the calibration area to the area of the background is greater than or equal to one;
    adjusting the calibration area until at least a portion of the background is not detectable; and
    storing an adjustment for the calibration area.

2. Logic encoded in one or more non-transitory media that includes code for execution and when executed by a processor is operable to perform operations comprising:
    displaying a calibration area surrounded by a background on a display;
    analyzing an image of the calibration area to determine if the background is detectable in the image;
    determining a percentage of the background that is detectable;
    adjusting the calibration area based on the percentage;
    adjusting the calibration area until at least a portion of the background is not detectable; and
    storing an adjustment for the calibration area.

3. A method, comprising:
    displaying a calibration area surrounded by a background on a display;
    analyzing an image of the calibration area to determine if the background is detectable in the image;
    determining a percentage of the background that is detectable;
    adjusting the calibration area based on the percentage;
    adjusting the calibration area until at least a portion of the background is not detectable; and
    storing an adjustment for the calibration area.

4. The method of claim 1, further comprising:
    decreasing a size of the calibration area if the size of the calibration area is bigger than the display.

5. The method of claim 1, further comprising:
    receiving a signal from a mobile device indicating that the background is detectable.

6. The method of claim 1, wherein the background is not detectible if the area of the background is less than two percent of an area of the display.

7. Logic encoded in one or more non-transitory media that includes code for execution and when executed by a processor is operable to perform operations comprising:
    displaying a calibration area surrounded by a background on a display;
    analyzing an image of the display to determine a ratio of an area of the calibration area to an area of the background;
    expanding the calibration area by a factor greater than one, if the ratio of the area of the calibration area to the area of the background is less than one;
    expanding the calibration area by a factor less than one, if the ratio of the area of the calibration area to the area of the background is greater than or equal to one;
    adjusting the calibration area until at least a portion of the background is not detectable; and
    storing an adjustment for the calibration area.

8. An apparatus, comprising:
    a memory element configured to store data;
    a processor operable to execute instructions associated with the data; and
    a mobile communication module configured to interface with the memory element and the processor, wherein the apparatus is configured for
        displaying a calibration area surrounded by a background on a display;
        analyzing an image of the calibration area to determine if the background is detectable in the image;
        determining a percentage of the background that is detectable;
        adjusting the calibration area based on the percentage;
        adjusting the calibration area until at least a portion of the background is not detectable; and
        storing an adjustment for the calibration area.

9. The logic of claim 7, the operations further comprising:
    receiving a signal from a mobile device indicating that the background is detectable.

10. The logic of claim 7, wherein the background is not detectible if the area of the background is less than two percent of an area of the display.

11. The logic of claim 7, the operations further comprising:
analyzing the image of the display for a color indicative of an area for rendering content on the display.

12. An apparatus, comprising:
a memory element configured to store data;
a processor operable to execute instructions associated with the data; and
a mobile communication module configured to interface with the memory element and the processor such that the apparatus is configured for
displaying a calibration area surrounded by a background on a display;
analyzing an image of the display to determine a ratio of an area of the calibration area to an area of the background;
expanding the calibration area by a factor greater than one, if the ratio of the area of the calibration area to the area of the background is less than one;
expanding the calibration area by a factor less than one, if the ratio of the area of the calibration area to the area of the background is greater than or equal to one;
adjusting the calibration area until at least a portion of the background is not detectable; and
storing an adjustment for the calibration area.

13. The apparatus of claim 12, wherein the apparatus is further configured for:
decreasing a size of the calibration area if the size of the calibration area is bigger than the display.

14. The method of Claim 1 wherein the apparatus is a set-top box configured to interact with a handset for adjusting the calibration area until the portion of the background is not detectable.

15. The apparatus of claim 12, wherein the apparatus is further configured for:
receiving a signal from a mobile device indicating that the background is detectable.

16. The apparatus of claim 12, wherein the background is not detectible if the area of the background is less than two percent of an area of the display.

17. The apparatus of claim 12, wherein the apparatus is further configured for:
analyzing the image of the display for a color indicative of an area for rendering content on the display.

18. The method of Claim 1 wherein the apparatus is a console element configured to interact with a mobile device for adjusting the calibration area until the portion of the background is not detectable.

19. The method of claim 1, further comprising:
analyzing the image of the display for a color indicative of an area for rendering content on the display.

20. The logic of claim 7, the operations further comprising:
decreasing a size of the calibration area if the size of the calibration area is bigger than the display.

* * * * *